US009576393B1

(12) United States Patent
Bethel

(10) Patent No.: US 9,576,393 B1
(45) Date of Patent: Feb. 21, 2017

(54) DYNAMIC RENDERING OF SOFT SHADOWS FOR INTERFACE ELEMENTS

(71) Applicant: Amazon Technologies, Inc., Reno, NV (US)

(72) Inventor: Zachary Colton Bethel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 274 days.

(21) Appl. No.: 14/314,975

(22) Filed: Jun. 25, 2014

Related U.S. Application Data

(60) Provisional application No. 62/013,536, filed on Jun. 18, 2014.

(51) Int. Cl.
*G06T 15/50* (2011.01)
*G06T 15/60* (2006.01)

(52) U.S. Cl.
CPC .................................... *G06T 15/60* (2013.01)

(58) Field of Classification Search
None
See application file for complete search history.

(56) References Cited

U.S. PATENT DOCUMENTS

| | | | | |
|---|---|---|---|---|
| 6,043,818 | A * | 3/2000 | Nakano | G06F 3/04815 345/473 |
| 7,439,975 | B2 * | 10/2008 | Hsu | G06T 15/60 345/426 |
| 7,675,518 | B1 * | 3/2010 | Miller | G06T 15/06 345/426 |
| 9,070,319 | B1 * | 6/2015 | Soni | G09G 5/14 |
| 2005/0259280 | A1 * | 11/2005 | Rozzi | H04N 1/6052 358/1.9 |
| 2007/0146389 | A1 * | 6/2007 | Distler | G06T 15/04 345/629 |
| 2008/0001968 | A1 * | 1/2008 | Krueger | G06T 11/60 345/629 |
| 2013/0135309 | A1 * | 5/2013 | King | G06T 15/60 345/426 |
| 2013/0198665 | A1 * | 8/2013 | Matas | G06T 11/60 715/765 |

* cited by examiner

*Primary Examiner* — Barry Drennan
*Assistant Examiner* — Jason Pringle-Parker
(74) *Attorney, Agent, or Firm* — Polsinelli LLP

(57) ABSTRACT

Soft shadows can be rendered using a relatively expensive blur process by leveraging the structure provided for various user interfaces. The elements of a user interface may be arranged according to a hierarchical tree or scene graph. Certain related elements may be grouped into a shadow group that can cast and/or receive a shadow. When the root of the shadow group is designated, the other child elements of the group can be added automatically, up to the boundary of another shadow group. A single texture for a shadow group can be determined, blurred, and projected onto a corresponding receiving group. If the shadow needs to be regenerated due to motion, for example, only a single texture needs to be regenerated for the group instead of a shadow for each element. A throttling value may be set to further limit the number of shadows that can be regenerated per frame.

19 Claims, 10 Drawing Sheets

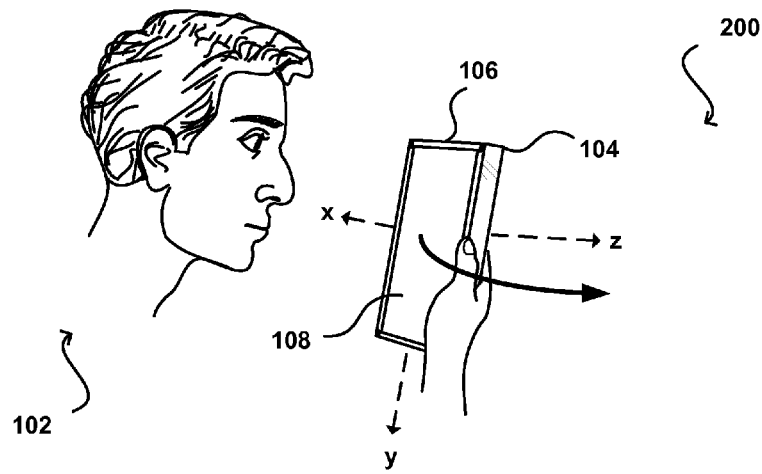
FIG. 2(a)
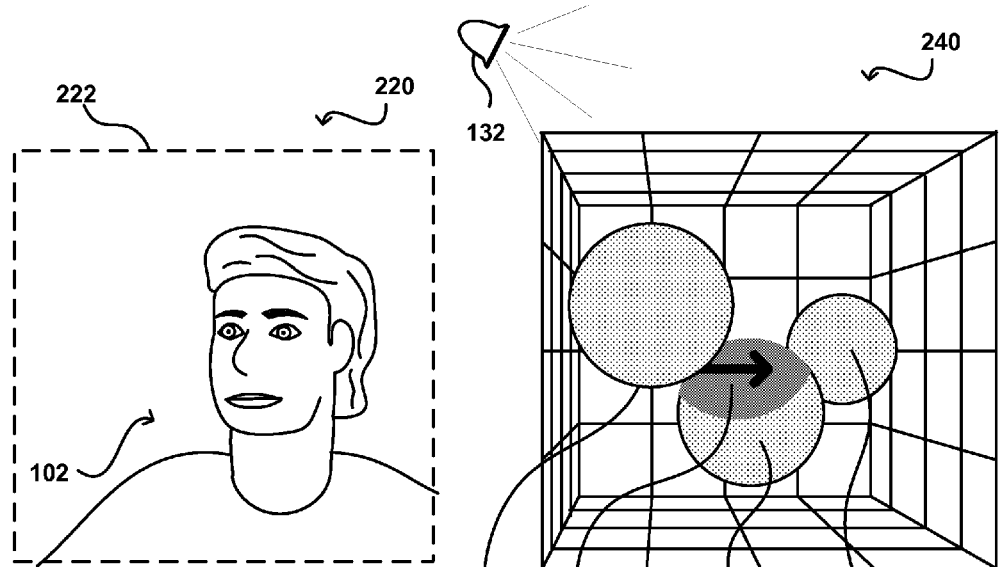
FIG. 2(b)
FIG. 2(c)

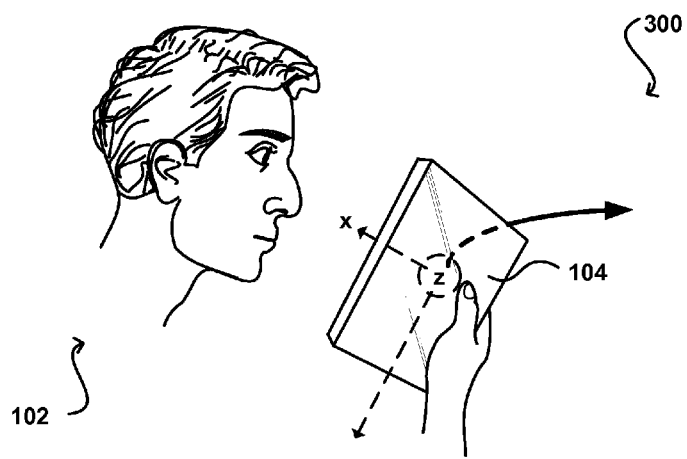
FIG. 3(a)
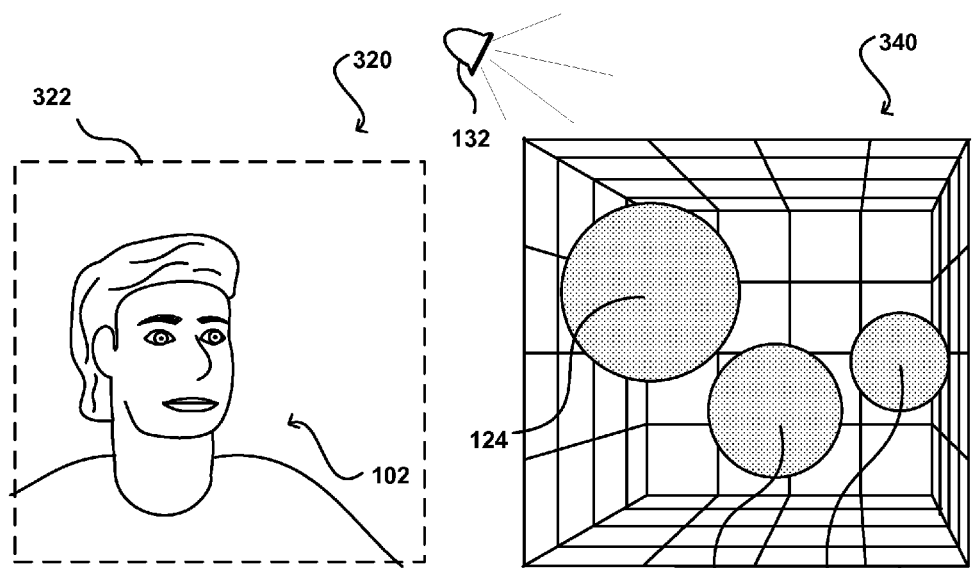
FIG. 3(b)
FIG. 3(c)

DYNAMIC RENDERING OF SOFT SHADOWS FOR INTERFACE ELEMENTS

CROSS REFERENCE TO RELATED APPLICATIONS

This application claims priority to U.S. Provisional Patent Application Ser. No. 62/013,536, filed Jun. 18, 2014, and entitled "Dynamic Rendering of Soft Shadows for Interface Elements," which is hereby incorporated herein by reference in its entirety for all purposes.

BACKGROUND

As computing devices, such as laptops, tablets, or smartphones, become increasingly sophisticated, new and interesting approaches have arisen for enabling such devices to convey information to a user. For instance, a graphical user interface (GUI) incorporating elements such as windows, icons, and menus may be an improvement over a command-line interface by simplifying how a user operates an underlying software application. As these interfaces move towards being more realistic, these elements can be given a shape and/or depth that enables them to provide a view that at least appears to show these elements in three-dimensional space. In order to achieve this effect, many interfaces utilize shadowing. Shadowing generally refers to determining which elements might cast a shadow on other elements given a determined spatial arrangement and a virtual light source location. For interfaces with many different elements, however, the need to continually determine and generate shadows for each of these elements can be relatively resource intensive, particularly for portable computing devices with limited battery life, memory, and processing power.

BRIEF DESCRIPTION OF THE DRAWINGS

Various embodiments in accordance with the present disclosure will be described with reference to the drawings, in which:

FIGS. 2(a), 2(b), and 2(c) illustrate a second arrangement of elements of a user interface that can be rendered in accordance with various embodiments;

FIGS. 3(a), 3(b), and 3(c) illustrate a third arrangement of elements of a user interface that can be rendered in accordance with various embodiments;

DETAILED DESCRIPTION

Figure 1A:
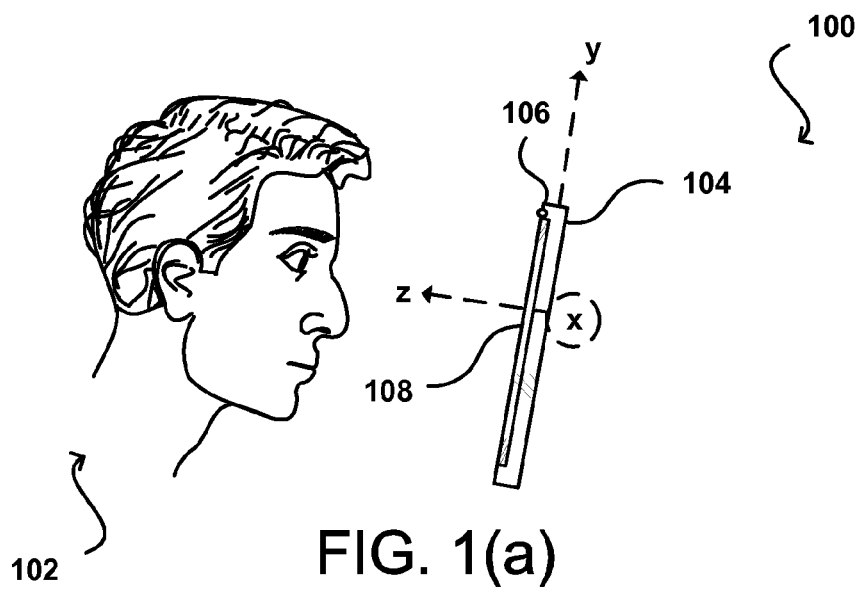
FIGS. 1(a) and 1(b) illustrate a first arrangement of elements of a user interface that can be rendered in accordance with various embodiments.

Approaches in accordance with various embodiments can overcome these and other deficiencies in existing approaches to rendering interfaces and/or generating graphical objects with three-dimensional aspects in an electronic environment. In particular, various embodiments provide for the grouping of graphical elements into shadow groups, where each shadow group can act as a caster, capable of casting shadows on at least one other element, and/or a receiver, capable of receiving shadows from at least one other element of a graphical user interface (GUI). In at least some embodiments, each element can be associated with a node of a scene graph or other such hierarchical tree. Based at least in part upon factors such as node level, direct node relationships, and element type, for example, elements can be grouped into one or more shadow groups. For a shadow group that is determined to be a caster, for example, an overall outline or shape of the elements of the shadow group can be determined and a single texture generated. A blur can be performed on the single texture in order to generate a silhouette with a soft appearance. A frustum can be determined based upon a virtual light source, for example, enabling the blurred shadow to projected onto one or more receivers for that shadow group. At least two different types of casting can be used, based at least in part upon whether a receiver is a two- or three-dimensional object. The use of a single texture for a shadow group conserves resources by only having to maintain and update a single texture for the group. As spatial relationships of the elements change, such as may be in response to motion of the computing device displaying the interface, for example, the shadow textures can be translated if the shape of the shadow group does not change more than a threshold amount. If the shapes change or if at least one element of a shadow group causes the silhouette to change appreciably, the texture for that group can be re-rendered. In order to conserve resources, a queue of re-renders can be used with a maximum number of shadows being re-rendered on a given rendering pass.

Various other functions and advantages are described and suggested below in accordance with the various embodiments.

FIGS. 1(a) through 3(c) illustrate an example approach for providing a user interface that includes elements rendered according to different depths, in order to provide a three dimensional view in response to movement of a user and/or a computing device. As discussed elsewhere herein, the motion in some embodiments can be detected using one or more motion sensors of the device, or by analyzing image data to determine relative movement of a user, or a combination thereof. In the example situation 100 of FIG. 1(a), a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein.

These devices can include, for example, set top boxes, media devices, desktop computers, notebook computers, personal data assistants, video gaming consoles or controllers, wearable computers (e.g., a smart watch or glasses), and portable media players, among others.

The computing device 104 illustrated in FIG. 1(a) can include at least one camera 106 located on the front of the device and the on same surface as the display screen to capture image data including a representation of the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

As illustrated in the example situation 100 of FIG. 1(a), the user is positioned directly in front of the computing device, or the computing device is in a default orientation, for example, such that the x-y plane (i.e., front face) of the device is perpendicular or substantially perpendicular to the user's line of sight (where the lateral axis corresponds to the x-axis, the longitudinal axis corresponds to the y-axis, and the depth of the device corresponds to the z-axis). As mentioned, in some embodiments it can be determined that the user is in such a relative position by capturing an image using a front facing camera of the device and then determining that a representation of the head of the user is approximately centered in the captured image. Although one image is described to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device. In this example, the device is capable of rendering one or more graphical elements for display on the two-dimensional display screen according to a viewing angle of the user with respect to the display screen, or a determined orientation of the device, among other such options. The device can rely on the relative position of the head or face of the user with respect to the device and/or the apparent motion of the user's head or face (due to motion of the head and/or the device) with respect to the device to draw or render one or more graphical elements on the display screen so as to simulate depth.

Figure 1B:
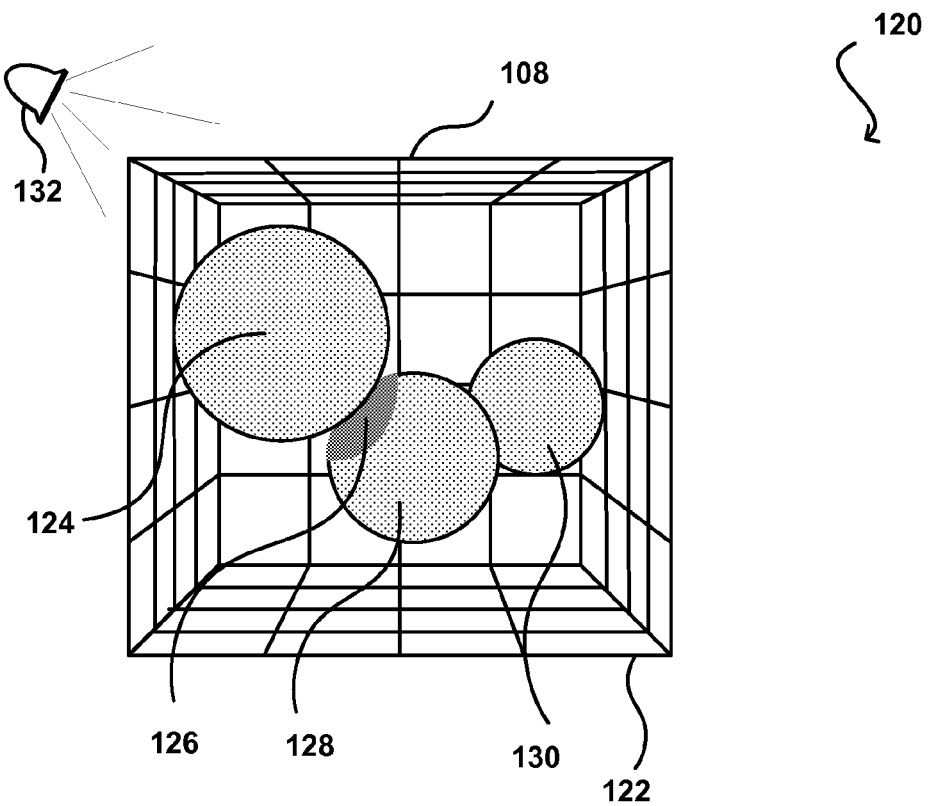

FIG. 1(b) illustrates an example of a user interface 120 presented on the display screen 108 based on a default orientation and/or viewing angle of the user with respect to the device. The user interface includes three user interface elements 124, 128, and 130 displayed within a 3D grid 122. The UI elements 124, 128, and 130 may be buttons for a user application that would normally appear to be the same size and shape to the user. However, here, the UI elements 124, 128, and 130 have each been scaled to give the user the impression that the UI elements are associated with different depths. In particular, UI element 124 appears to be at a depth closest to the user and corresponds to a largest scale, UI element 128 appears to be positioned at an intermediate depth and corresponds to an intermediate scale, and UI element 130 appears to be at depth furthest away from the user and corresponds to the smallest scale. It will be appreciated that other transformations can also be applied to UI elements to simulate depth, including rotations, translations, and perspective projections, among other transformations. To further enhance an impression that the user interface has depth, a virtual light source 132 may be determined to be "positioned" off-screen, such as at the top left corner of a 3D grid-box 122. As mentioned, the shadows generated by a virtual light source can depend on the color, intensity, direction, position, and/or falloff function of the light source. Further, the light source can be modeled as a directional light, a point light, or a spotlight. A directional light is produced by a light source at an infinite distance from the scene and all of the rays emanating from the light source strike UI elements from a single parallel direction and with equal intensity everywhere. A point light, as illustrated in the example of FIG. 1(b), is a light that gives off equal amounts of light in all directions. UI elements closer to the light may appear brighter than those further away, or may appear at the same brightness but have shadows cast thereon. A spotlight is a light that radiates light in a cone with more light emanating from the center of the cone and gradually tapering off the further the away from the center. Modeling a light source based on one of a directional light, point light, or spotlight is known to those of ordinary skill in the art, and will not be discussed in detail herein. In some embodiments, the virtual light source may not be fixed as in the examples of FIGS. 1(b), 2(c), and 3(c). Instead, the virtual light source may be positioned with respect to a user and/or a computing device such that when the user and/or computing device move, the virtual light source also moves with the user and/or computing device.

In the example illustrated in FIG. 1(b), the virtual light source 132 is positioned such that a UI element 124 at a highest depth level casts a shadow 126 on a portion of a lower depth UI element 128. The highest depth level UI element 114, on the other hand, does not cast a shadow on the lowest level UI element 130 because the position of the UI element 130 is not included in the projection or frustum of the light source 132 that includes the outline or silhouette of the highest depth level UI element 124. Approaches for drawing or rendering shadows for UI elements are discussed in co-pending U.S. patent application Ser. No. 14/035,897, entitled "Generating Virtual Shadows for Displayable Elements," filed on Sep. 24, 2013, which is incorporated herein by reference.

It might be the case that the relative position of the user with respect to the device might change, whether through movement of the user, the device, or both. For example, in the example situation 200 illustrated in FIG. 2(a) the user 102 has rotated or tilted the computing device 104 to the right with respect to the user, i.e., the user has rotated the device to his right along the longitudinal or y-axis. As seen in the example situation 220 of FIG. 2(b), the tilt or rotation of the device causes the camera to capture a different view or perspective of the user within a captured image 222, with the representation of the user 102 being off to the right in the image. In some embodiments, an analysis might also be performed to determine that the representation is a three-quarters profile of the head or face of the user facing leftward, providing additional information about the relative orientation of the user. In this example, the apparent motion of the face or head of the user (which may be primarily due to the motion of the device) can be tracked from an initial position or central position, detected in an initial image corresponding to the orientation of FIG. 1(a), to the new position depicted in FIG. 2(b). Based on the relative movement between the device and the user's head, the user interface can be redrawn or rendered for display to correspond to the new viewing angle of the user 102. For example, as illustrated in the example view 240 of FIG. 2(c), when the user tilts the device rightward, the device will apply rotations, scales, translations, and/or perspective projections, among other transformations, to the interface elements 124, 128, and 130 based on the new viewing angle of the user. For example, the 3D grid 122 has been skewed such that the right face of the grid appears more prominently in the display screen while the left face of the grid is presented at more of an oblique angle when the user rotates the device laterally to the right. The UI elements 124, 128, and 130 are also redrawn or rendered to correspond to the new viewing angle of the user with respect to the device. Further, the shadow 126 cast by the top element 124 onto the underlying element 128 has been re-rendered to be consistent with the off-screen virtual light source 132 and the transformed UI elements such that the shadow 126 appears much more prominently in FIG. 2(c) than in FIG. 1(b).

FIG. 3(a) illustrates an example situation 300 wherein the user 102 has tilted the computing device 104 to the left with respect to the user, i.e., the user has rotated the device to his left along the longitudinal or y-axis. As seen in the example image 322 illustrated in the situation 320 of FIG. 3(b), the tilt or rotation of the device (or relative movement of the user) causes the camera to capture an image in which the position of the representation of the user's head has shifted towards the left in the image 322. Similarly, the view of the user has changed to a three-quarters profile of the user facing rightward, to provide further orientation information where appropriate. In this example, the apparent movement of the face or head of the user (which, again, may be primarily due to the movement of the device) can be tracked from the previous position depicted in FIG. 2(b) to the new position depicted in FIG. 3(b). The UI elements 124, 128, and 130 can be redrawn or rendered for display based on the apparent relative motion between the user's head and the device. For example, the user interface may transform and/or be animated from the view depicted in FIG. 2(c) through the view depicted in FIG. 1(b) to the example view 340 depicted in FIG. 3(c). In particular, the 3D grid 122 may be rendered such that the left face of the grid is presented more prominently and the right face of the grid is displayed at a more oblique angle, and the UI elements 124, 128, and 130 may also be rotated, translated, scaled, or otherwise transformed in accordance with the new viewing angle of the user. In this example, the new viewing angle of the user causes the UI elements 124, 128, and 130 to be rendered such the top element 124 no longer casts a shadow on the underlying element 128 using a projection from the virtual light source 132. It will be appreciated that the head or face of the user can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the right and bottom faces of the 3D grid 122 may be displayed more prominently and the left and top faces may be displayed less prominently. When the user tilts the device forward and towards his left (i.e., such that the bottom right corner of the device is the closest point of the device to the user), the left and top faces of the grid can be displayed with greater detail, and the right and bottom faces may be presented with fewer details. The UI elements 124, 128, and 130 can be re-rendered accordingly. Such an approach may give a user an impression that he is interacting with the UI elements in an environment having 3D depth.

In addition, or alternatively, a computing device can include one or more motion and/or orientation determination components, such as an accelerometer, gyroscope, magnetometer, or a combination thereof, that can be used to determine the position and/or orientation of the device. In some embodiments, the device can be configured to monitor for a change in position and/or orientation of the device using the motion and/or orientation determination components. Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone. These various approaches—image-based head tracking of the user, motion/orientation sensor-based monitoring of the device, or a combined approach—are discussed in in co-pending U.S. patent application Ser. No. 13/965,126, entitled, "Robust User Detection and Tracking," filed Aug. 12, 2013, which is incorporated herein by reference.

When rendering a shadow on a graphical element, it can be necessary to determine the position (or at least direction) of the virtual light source, as well as the spatial arrangement of each of the UI elements with respect to the light source. A frustum can be determined that starts at the location (or direction) of the point light source and casts "down" onto the elements. Any element that at least partially occludes at least a portion of that frustum can cause a shadow to be cast on an element that is further from the light source but within a similar portion of the frustum. Shadows in interfaces generally provide a better appearance if those shadows are "soft" shadows, or shadows that do not have a hard edge but instead are relatively blurred around the edges. In order to generate such an effect, it is necessary to determine the portion of the underlying element upon which a portion of the shadow will be cast, determine the amount of shadowing or blur, and then "blend" or render the shadow and element components together to generate a UI element with the desired shadow effect cast thereon.

Because rendering can be very processor and memory intensive, certain conventional approaches to displaying shadows utilize a set of pre-rendered graphics that can be selected and displayed at the appropriate times. For GUIs that can have many changing elements that move in many different directions, and can change in spatial arrangement, it can be impractical at best to have to pre-render a graphical element for each possible position of a shadow that can be cast on any particular element. It can be desirable to have soft shadows that are dynamic and that can update in at least near real time, but without the need to pre-render every possible permutation.

A conventional shadow rendering approach would involve determining the virtual light position or direction (as discussed above) and rendering the scene from the perspective of the light. This can involve doing depth and spatial arrangement calculations to determine which elements have shadows cast thereon, and dynamically rendering (or shading) the soft shadow appearance on each affected element. A downside to such an approach is that the blurring for the soft shadow has to be done in near real time, which can be expensive in terms of processor and memory capacity, particularly for portable computing devices with limited resources. Further, in many cases the compromises that need to be made to make the UI sufficiently fast result in shadows that may not be visually acceptable.

Accordingly, approaches in accordance with various embodiments can provide for the rendering of soft shadows in near real time by leveraging restrictions and/or features that may exist in various 3D, or quasi-3D, user interfaces. In particular, various embodiments can take advantage of the fact that objects are present in a view hierarchy. The view hierarchy has a root view and a set of child views, wherein the child views float above a respective parent view group. Interpenetrating objects in such an interface are rare. Unlike conventional approaches that utilize a global shadow map to capture depth and resolve the status of each shadow at render time, approaches presented herein can determine one or more shadow casting groups, and can render and blur one shadow texture per casting group. Each shadow texture can then be projected onto the appropriate receiving elements, or "receivers," at an appropriate time or rate, such as may be based on the number of textures to be re-rendered. The use of casting groups as opposed to individual elements enables some resource savings as opposed to conventional approaches that perform dynamic shading per element. For example, shadow maps can be generated once and cached. Since the cost (from at least a resource perspective) is no longer per-frame, a relatively high-quality blur can be applied to the silhouette of the casting shadow group, or caster, to obtain a soft shadow that is relatively high quality in appearance (i.e., nice smooth transition). Further, approaches can provide fine-tuned control over when each shadow is regenerated. Specifically, shadow updates can be throttled on the per-frame basis, which can help to improve performance for dynamic scenes, at the potential cost of some minor visual shadow "stuttering" artifacts, where the updating at less than the nominal frame rate might exhibit slight delays in updating relative to the movement of the UI elements. Another advantage is that updating of a shadow can be avoided if the affected object hasn't moved. Even for slight movements the shadow texture can be reused without a different texture being generated, as the cast shadow can be "translated" in response to the movement.

Figure 4:
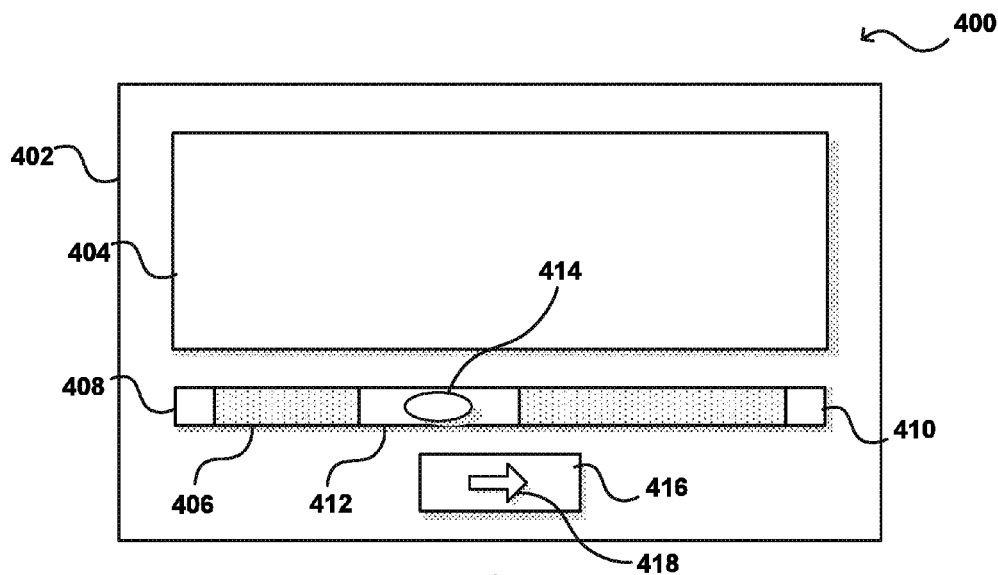
FIG. 4 illustrates an example of a user interface including elements rendered to have a three-dimensional appearance in accordance with various embodiments.

For example, consider the example interface 400 presented in FIG. 4. The interface is composed of a background window 402, which functions as the root node in the hierarchical tree, or "scene graph." A text box 404 that hovers over the background window 402, acting as a child node to the background window 402. A slider bar control hovers over the background window 402, where the slider bar control includes a background element 406, over which hover two end portions 408, 410, and a slider 412. A slider glyph 414 hovers over the slider 412. A button 416 also hovers over the background window 402, with a button glyph 418 hovering over the button 416. Various other elements and arrangements are possible as well as should be apparent in light of the teachings and suggestions contained herein.

Figures 5A, 5B:
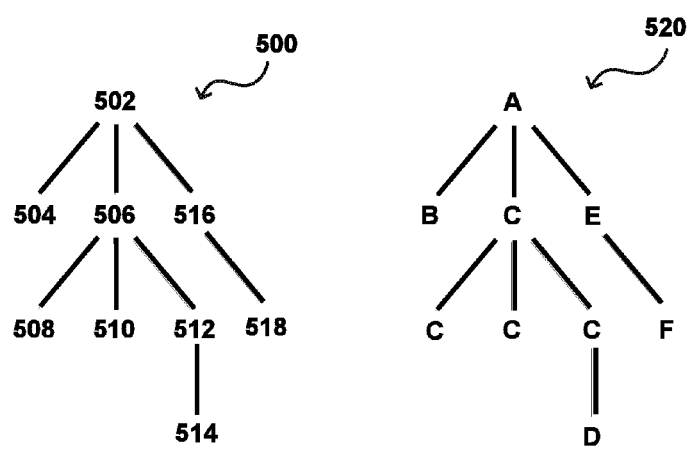
FIGS. 5(a) and 5(b) illustrate example scene graphs and shadow groupings for the interface elements of FIG. 4, which can be used in accordance with various embodiments.

As mentioned, the elements of the interface are associated with nodes of a hierarchical tree, or scene graph. An example of such a tree 500 for the example interface is illustrated in FIG. 5(a). By convention, the elements towards the back appear toward the top of the tree, as the background window 402 functions as the root node at the "top" of the tree. Other conventions can be used as well. The reference numbers from FIG. 4 are used to indicate the respective elements corresponding to the other nodes of the tree 500. In this example, the text box 404, slider bar background 406, and button 416 are all direct children of the background window 402 root node. The elements of the slider bar 408, 410, 412 are direct children of the slider background 406, and the slider glyph 414 is a child of the slider 412. The button glyph 418 is also a child node of the button 416.

An element for each child node can cast a shadow on an element for a direct parent node. It is also possible that elements for child nodes can cast shadows on elements for grandparent nodes and other nodes up to the root node. In at least some instances, elements can be positioned in fixed relationships with respect to one another. For example, the text box 404, slider background 406, and button 416 may all be configured to hover above the window background 402, and the shadows cast by these elements on the window background 402 thus can be configured to move together with changes in device orientation. Accordingly, it can be desirable to attempt to group these elements together in order to reduce the amount of resources needed to update shadows cast by these elements on the background window.

Similarly, some elements cast a collective shadow on elements of parent nodes for those elements. For example, consider the slider control that is comprised of the slider background 406, slider ends 408, 410, and slider 412. That slider control will cast a single shadow onto the window background 402, such that it can be advantageous to combine those elements into a single shadow group. Similarly, the button 416 and button glyph 418 might be desirable to combine into a shadow group that will cast a single effective shadow onto the window background 402, although in some embodiments the glyph might cast a separate shadow, etc.

One way to group elements to minimize the number of shadows that need to be rendered is to group each element of a particular control into a common group. For example, in the tree 520 of FIG. 5(b) each node that is a child node of the root node, and thus could cast a shadow on the element associated with the root node, can initially be tagged with shadow group A, corresponding to the root node. The text box, which is a child of the root and can cast a shadow on the window background, might be set to another shadow group B, which can act as a caster to cast a shadow on the parent, and direct descendant, root A. The slider control can be set as another shadow group that can act as a caster and cast a shadow on root A. With the slider background as a root of the sub-tree, the root can be assigned to shadow group C, and then a "flood" type fill can cause the child nodes of the slider background to also be painted or tagged with shadow group C. Because the slider glyph hovers over the other controls, that glyph might be assigned to separate shadow group D, such as where its shadow might vary from that of the overall slider control. Similarly, the button might be assigned shadow group E, which could also paint the button glyph, although in this example the button glyph that hovers over the button can be assigned to separate shadow group F.

An advantage to grouping elements into shadow groups is that savings can be obtained in the number of shadows that have to be rendered and updated. For example, combining the four elements of the slider group into a common shadow group enables the silhouette of the group to be used to generate a single shadow texture, which then can be projected onto the parent node, here the window background, as needed. For example, the slider group might have a silhouette (or overall outline) that is primarily defined by the slider background 406, with some slight deviations for the other elements of the slider group due to the relative position of the virtual light source. This silhouette can be used to generate a single shadow texture that can be projected down onto the window background, instead of having to determine four separate shadows for the slider group and project each of those down onto the window background.

Figure 6A:
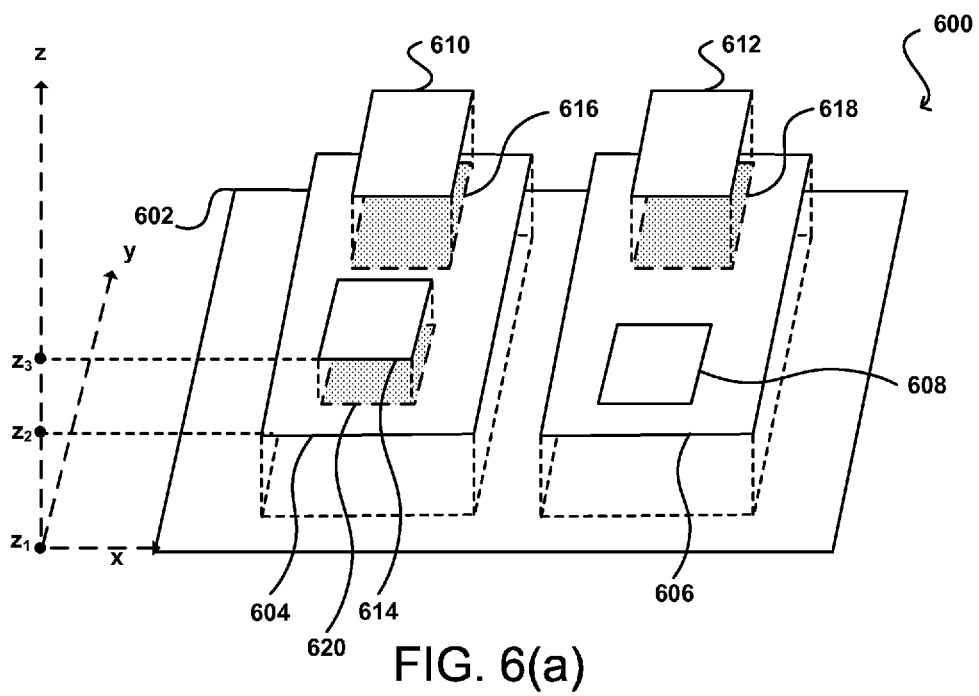
FIGS. 6(a), 6(b), and 6(c) illustrate use of a soft shadow texture with changes in a spatial arrangement of elements that can be utilized in accordance with various embodiments.

Further, if the device tilts by a relatively small amount such that the shape of the silhouette does not change by more than a threshold amount, the shadow texture may not need to be regenerated, as discussed elsewhere, but can instead simply be translated across the receiver. For example, consider the example arrangement 600 of interface elements displayed in FIG. 6(a). In this example, there is again a background 602 corresponding to the root node, with elements 604, 606 that correspond to children of the root node. A first pair of UI elements 610, 614 includes children of one of the UI element 604, and a second pair of UI elements 612, 608 are children of another of the UI elements 606. As illustrated in the figure, the first pair of UI elements each cast a shadow 616, 620 onto the parent node element 604. Only one element 612 of the second pair casts a shadow 618, although both elements 608, 612 can be considered part of a shadow group. Elements 604 and 606 will likely cast shadows in this situation as well, although those are not addressed in the current discussion.

Figure 6B:
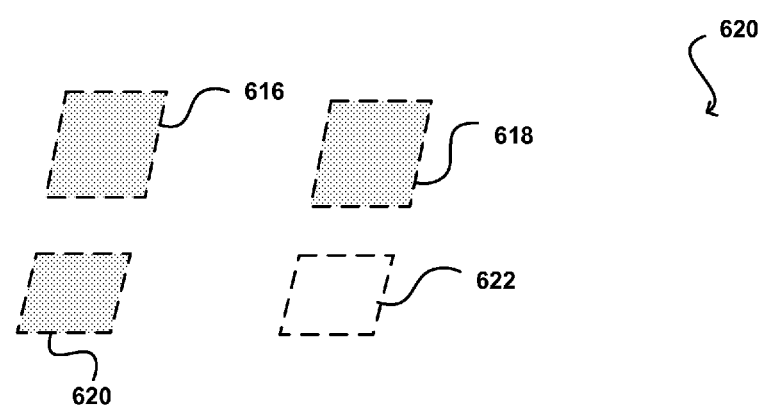

The shadows cast 616, 618, 620 are illustrated by themselves in the example arrangement 620 of FIG. 6(b). The first pair of shadows 616, 620 is part of a first shadow group, such that the silhouette of the texture for that shadow group can comprise the outlines of the two elements. The second pair only includes one shadow 618 that is cast, but for tracking purposes the shadow texture comprising the shadow 618 from the casting element 612 of the pair can also inherently include the lack of shadow 622 cast by the other element 608 of the pair. Thus, in this case the shadows cast by four elements can instead be considered as only two shadows for texture generation purposes. If the elements were all considered part of the same shadow group that included the parent elements 604, 606 as well, then a single texture might be used. As discussed, these reductions can reduce resource capacity needs and can allow for higher quality renderings where desired.

Figure 6C:
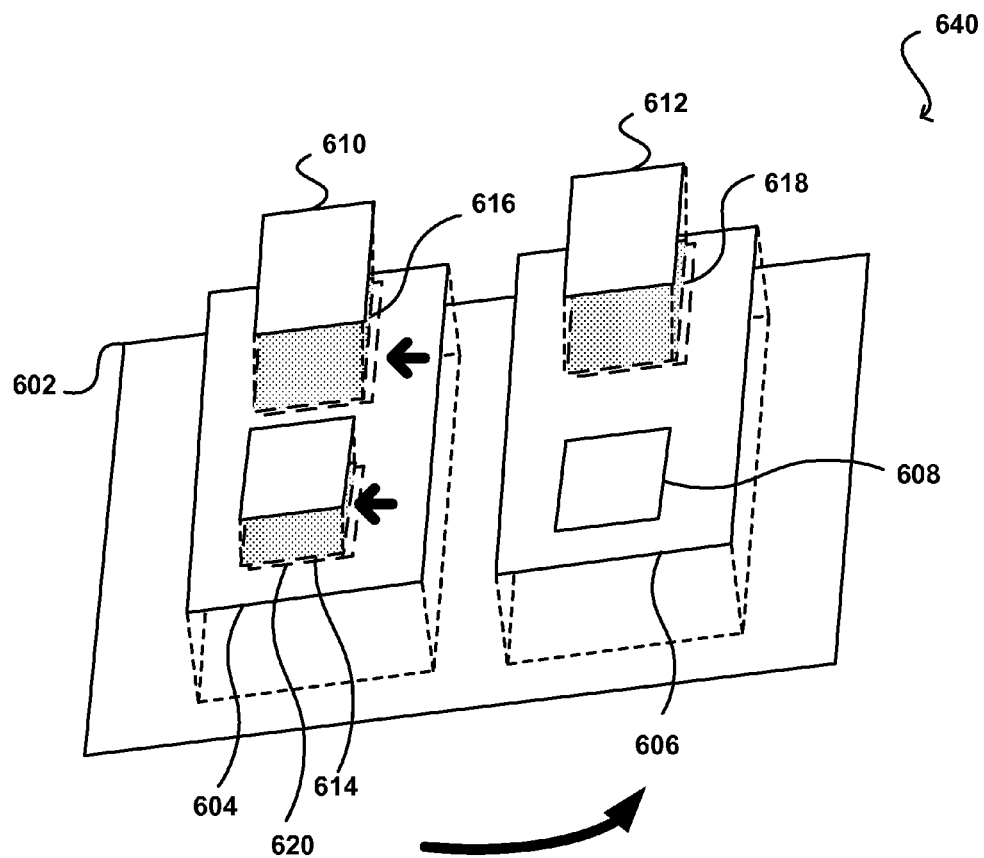

As mentioned, another advantage is that textures can be translated without regeneration for small changes in orientation. For example, consider the example 640 illustrated in FIG. 6(c). In this example, the rotation causes the locations of the shadows 616, 618, 620 to change. Because the change in location is relatively small, such as less than an allowable threshold, and the appropriate silhouette does not change appreciably for such a small change, the shadows can simply be "translated" (in the direction of the arrows in this example) slightly without having to regenerate the shadows. This further reduces the resources needed to provide for the dynamic nature of the soft shadows.

Figure 7A:
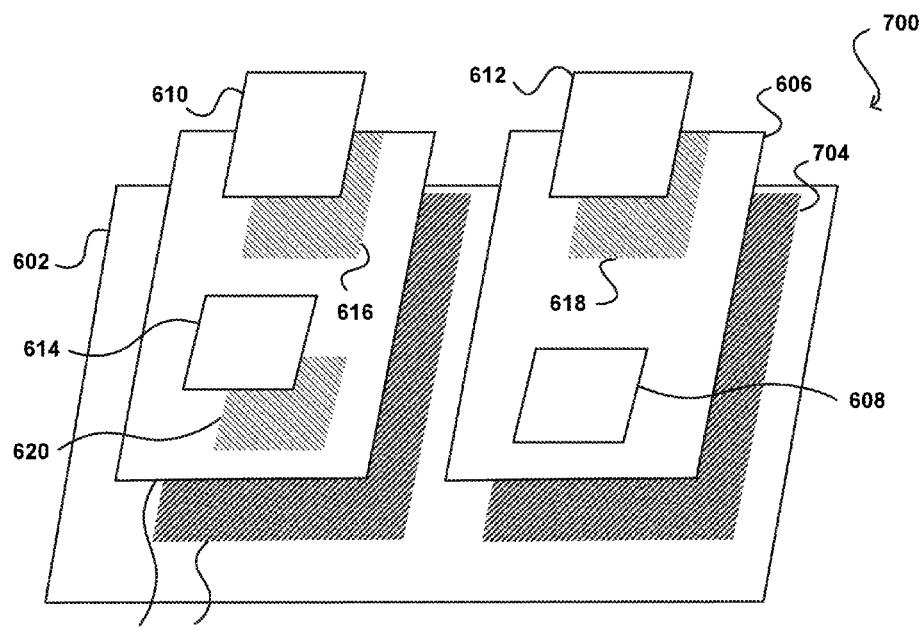
FIGS. 7(a) and 7(b) illustrate an example situation requiring re-rendering of a soft shadow for a shadow group in accordance with various embodiments.
Figure 7B:
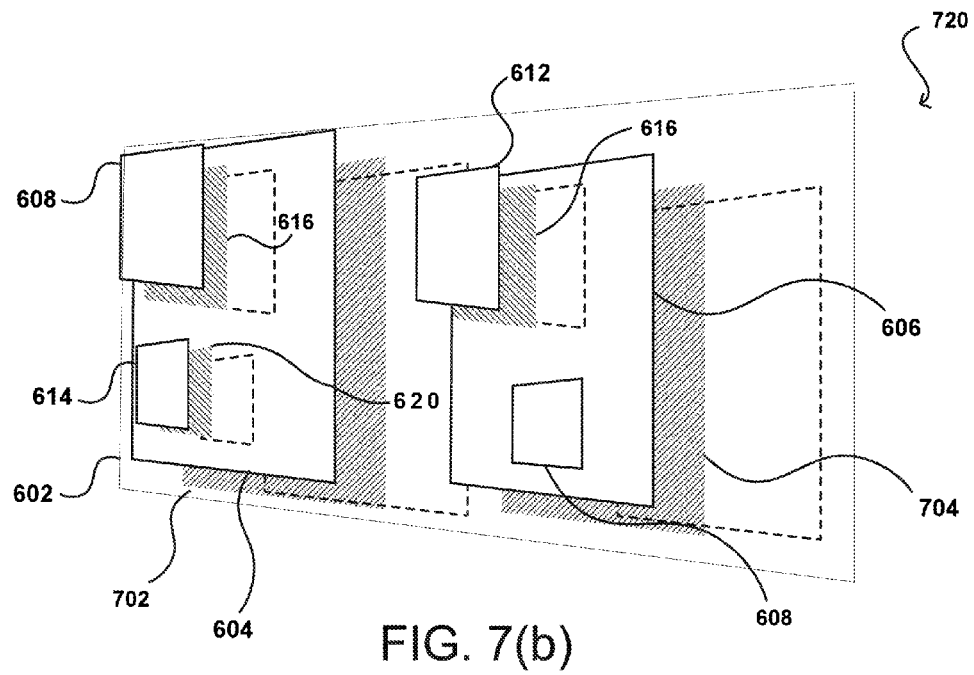

If the rotation is more extreme, however, at least some shadow regeneration may be necessary. For example, consider the interface arrangement illustrated in FIG. 7(a). Reference numbers may be carried over for similar elements between figures for purposes of simplicity of explanation, but these should not be interpreted as limitations on the various embodiments. In this example, the position of the light source is substantially "overhead" such that in this orientation the elements are substantially rectangular and parallel, such that the shadows cast are also substantially rectangular (with some level of deviation due to the blurring around the edges). In this example, it is illustrated that two elements 604, 606 also cast shadows 702, 704 on the window background 602. In FIG. 7(b) the orientation has changed such that the shapes of the elements have changed appreciably, causing a similar change to the silhouette of the shadow groups. Accordingly, the shadow textures may need to be regenerated for each casting shadow group in order to account for the change in shape, as well as the portions of the receiving elements that may receive portions of the newly rendered shadows. As illustrated, a simply translations of the shadows in FIG. 7(a) would not result in an acceptable appearance in FIG. 7(b). Other changes can require refreshing of the shadows as well, such as may include scaling or certain rotational changes of the elements.

As mentioned, a shadow group-based approach can utilize a scene graph for 3D content in a scene to be rendered. Each scene node can represent a point in space local to its parent, and may have 3D geometry attached. To enable shadows, specific scene nodes in the graph can be marked as the root of a shadow group. The process can crawl down the graph and absorb child nodes into its shadow group, similar to a (unidirectional) floodfill in a paint program. Likewise, marking a child node as a shadow group can flood fill the subtree. If a child of a shadow group is designated as a new shadow group, the flood fill would stop at the boundaries of the new shadow group. Having a flexible granularity of shadow groups allows for a variety of use-cases, such as those of the 3D and complex slider control discussed above. The shadow grouping can allow for the generation of a single shadow for the entire control.

In at least some embodiments, each shadow group can cast and/or receive a shadow from any other shadow group in the scene. A receiving shadow group may receive different types of shadows, as may include a decal shadow or a drop shadow, among other such options. A drop shadow corresponds to a shadow texture that is projected onto a two-dimensional element, which can take the form of a simple textured quad. Drop shadows are extremely fast and can be well situated for the background plane or element, which will generally receive the brunt of all shadows in the scene. A decal shadow is "applied" to a three-dimensional element during the projection, which is a slightly more expensive process than for a drop shadow. The use of a decal shadow, however, allows the caster to project the texture onto the geometry of the receiver such that the shadow conforms to the shape of the geometry.

When analyzing the various shadow groups, it is necessary in at least some embodiments to determine which shadow groups are casters and which are receivers. A shadow group can be both a caster and a receiver. In order for a shadow to be cast, there needs to be at least one receiver for a given shadow group that is functioning as a caster. Prior to rendering, an update cycle can be executed wherein all the shadow/receiver pairs in the scene are determined. In some embodiments a set of intersection tests can be performed. If a receiver is a direct ancestor to a specified caster, the test succeeds and a shadow should be determined. This can be a fundamental constraint for some approaches. If the receiver and caster are not directly related, a spatial test can be used to determine whether a shadow from the caster would be received by the receiver. The combination of these two criteria should solve most of the ambiguity problems present with a conventional spatial test. In some embodiments a pass runs automatically that collects all the shadow groups in the scene, performs a caster/receiver intersection test, determines which caster casts on which receiver, then causes the 3D geometry projections to be performed for the rendering.

Approaches in accordance with various embodiments will also have to determine, once a shadow has been generated, when it is necessary and/or appropriate to update the shadow. In some embodiments, a shadow group can be determined to be "dirty," or otherwise in need of an update, in response to a change in shape, amount of movement, or other change that causes the current shadow to no longer be appropriate. It at least some embodiments a determination that a shadow casting group is dirty can cause information for the shadow casting group to be added to an update queue, shadow regeneration queue, or other such queue or buffer. The updates can be pulled from the queue based on a number of different factors, such as the throttle value settings of the system. For example, a system without a throttle value might update every dirty shadow group for each frame to be displayed, although for a large number of elements and/or frequent updates this can require a substantial amount of resources. If the throttle value settings specify that at most a determined number of shadows may be updated for a given frame, a subset of the generation queue up to the determined number may be pulled from the queue and rendered for the next frame. The throttle value setting can provide an upper bound on how expensive the process will be, at the cost of a slightly lower frame rate for shadow updates. The softness of the shadow can, however, help to slightly mask the difference in frame rate.

For memory and performance reasons, shadows can be rendered into an atlas. An atlas can utilize an axis-aligned binary space positioning (BSP) tree to allocate texture space on strict power-of-two boundaries for each axis. This restriction can allow for rapid allocations and de-allocations of atlas space at the cost of some packing efficiency. Utilizing an atlas can also allow for batching of shadow quads into a single call, such as an OpenGL draw call. By only regenerating shadow textures at the throttled rate and when a view validates, the changes happen infrequently enough that the relatively expensive soft shadow generation pass can be run in near real time. The atlasing algorithm can also help with casting shadows on three-dimensional objects. Projective texturing can be used to cast onto an object using a frustum associated with the caster. Having every texture associated with every caster as a separate GL texture, such that every texture must be rendered, as a separate drop call would cause substantial performance problems in many situations because the drop call and openGL are relatively expensive. By instead using an atlasing algorithm for the shadow groups, one large texture can be allocated for all of the shadows. The shadows can be divided into cells in some embodiments, and allocated out to the shadow groups. All the shadows then can be rendered at once into the render target. Such an approach enables all the geometry to share the same texture and enables all the quads to be rendered with a single drop call, which can be substantially cheaper than the calls for each separate texture as discussed above. Such an approach also can be fully dynamic, as shadow groups can frequently release their shadow cells and reacquire them at different sizes or renderings as things change.

When running a shadow update pass using an atlas-based approach, an iteration can be performed through all the meshes or elements, in order to collect the combined bounding box of all the meshes. A frustum can be fit to the bounding box along the direction of the light source. When rendering the shadow, the geometry can frustum can be used to render into the texture to generate the silhouette. From the frustum perspective, a rendering into the shadow atlas can help to determine which cells in the atlas are being rendering into, as well as the width of the frustum in pixel space. The frustum then can be quarter sized, or otherwise reduced, in order to improve texture memory utilization, and bilinear filtering can be performed in order to improve the visibility of the blurring. The atlas algorithm can be used to allocate a new cell if the size has changed more than a threshold amount. In at least some embodiments, the sizes in the atlas are all constrained to the power of two dimensions. If an object scales by one pixel, a power of two boundary has not been passed and the same cell can be retained. Such an approach can utilize a little more memory, but can greatly simplify the atlas allocation algorithm. Such an approach also reduces the frequency of shadow regeneration.

In at least some embodiments, the silhouette of one or more objects is generated as a black object, with the shadow atlas being 8-bit, such that it is not a fully colored buffer. The value (e.g., 0-255) of the darkness for each pixel in the silhouette can be determined, and the alpha values of the textures can be determined. A mesh with a partially transparent texture can be used, which will be utilized in shadow generation. Once the hard silhouette is obtained, a two-pass Gaussian blur (or similar blurring process) can be applied. A two-pass Gaussian blur can be relatively wide, but the width is adjustable in at least some embodiments. Once the fully Gaussian blurred image is written into the atlas, it is ready to be projected. The projection can use the value in the atlas as a darkness factor, with the shadows being grayscale in many embodiments but modulated with the color of the receiver. In some embodiments, all shadow groups to be rendered can be collected in a given pass, and an openGL extension can be used that allows for the incremental changing of a render target without unresolving the target. All unblurred silhouettes can be rendered into a render target of the atlas. For the two pass Gaussian blur in one embodiment, two different textures can be allocated for two copies of the atlas, and the process can alternate between them. If five cells are being generated, in a first pass the silhouettes of the 3D geometry will be rendered into the five cells of our atlas. A first switch can be made and this can be used as the input texture to render the five cells using the horizontal Gaussian blur pass. Another switch can be made to render the cells using a vertical Gaussian blur pass. Such an approach enables five textures to be rendered and generated with only two switches or swaps. Anytime an object moves more than a threshold amount, a flag can be set on that shadow group indicating that the texture is dirty and needs to be regenerated using such a process. As mentioned, the number of regenerations per frame can depend at least in part upon the throttling parameter. Each regeneration task can have a counter incremented for each frame in the shadow regeneration queue, and the shadow generation queue can be sorted each frame such that the older tasks are pushed to the top of the queue so no requests are being starved or forced to wait more than a determined number of frames before being processed. In some embodiments the throttle value can be exceeded if necessary to prevent one or more tasks from exceeding an allowable refresh delay, or other such metric.

Figure 8:
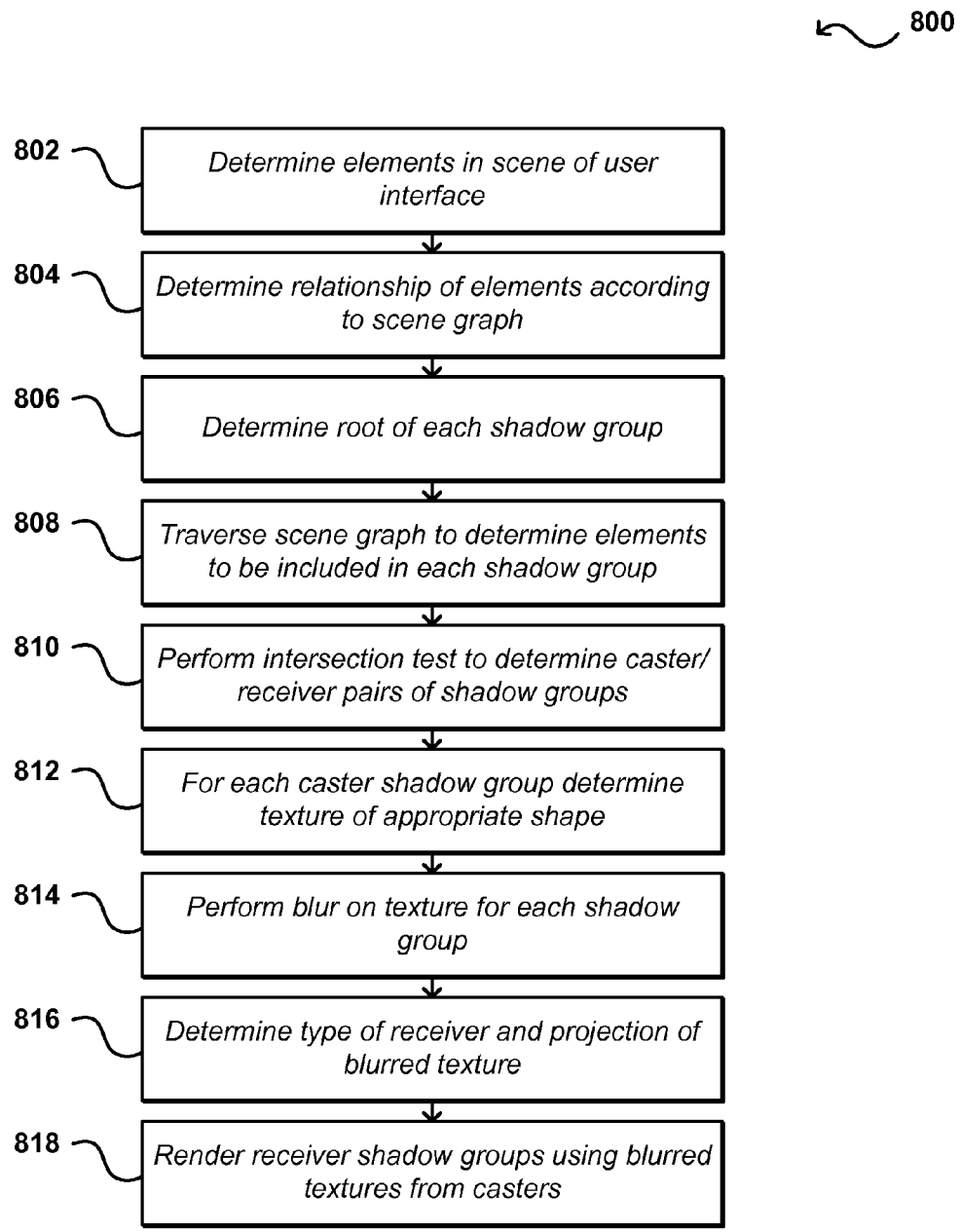
FIG. 8 illustrates an example process for determining shadow groups and rendering soft shadows for those groups that can be utilized in accordance with various embodiments.

FIG. 8 illustrates an example process 800 for rendering soft shadows in a graphical user interface that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, the elements in a scene to be rendered as part of a graphical user interface are determined 802. The elements to be rendered can be determined based upon a number of different factors, such as an application executing on a computing device, a viewing angle of the user, and other such information. The relationships between the elements can be determined 804 according to a scene graph, for example, which can associate each element with a node of the scene graph, or another such hierarchical tree. As discussed herein, the subsets of the elements may be able to be advantageously grouped into shadow groups, as may be based at least in part upon their relationships spatially, hierarchically, and/or functionally. For each of these shadow groups, the element associated with the root of the group can be determined 806. The scene graph can then be traversed 808 to determine any elements that are to be included in a particular shadow group. As discussed, this can include adding elements associated with child nodes of the root node of a shadow group until another shadow group boundary is detected.

Once the shadow groups are determined, or at least a portion of the shadow groups in some embodiments, an intersection test or other such process can be performed 810 to determine caster/receiver pairs of the shadow groups, such as where the groups are direct ancestors or the spatial arrangement indicates such a pairing. For each shadow group determined to be a caster, the texture can be determined 812 having the appropriate size and shape. A blur, such as a two-pass Gaussian blur, can be performed 814 on the texture for each casting shadow group, in order to generate a shadow with a soft silhouette. The type of receiver, such as a two- or three-dimensional receiver, as well as a projection of the caster on the receiver, can be determined 816, and the shadow group can be rendered 818 using the blurred texture from the caster and the texture of the receiver. As discussed, this can include determining whether a drop shadow should be projected onto a two dimensional object using a texture quad or whether a decal shadow should be projected onto a three dimensional object. The shadow can be rendered by blending the pixel values for the projected texture with the corresponding pixel values of the receiver to cause the affected pixels of the receiver shadow group to change in appearance to appear to be affected by the shadow, such as to appear darker or more gray than pixels outside the region of the projected shadow.

Figure 9:
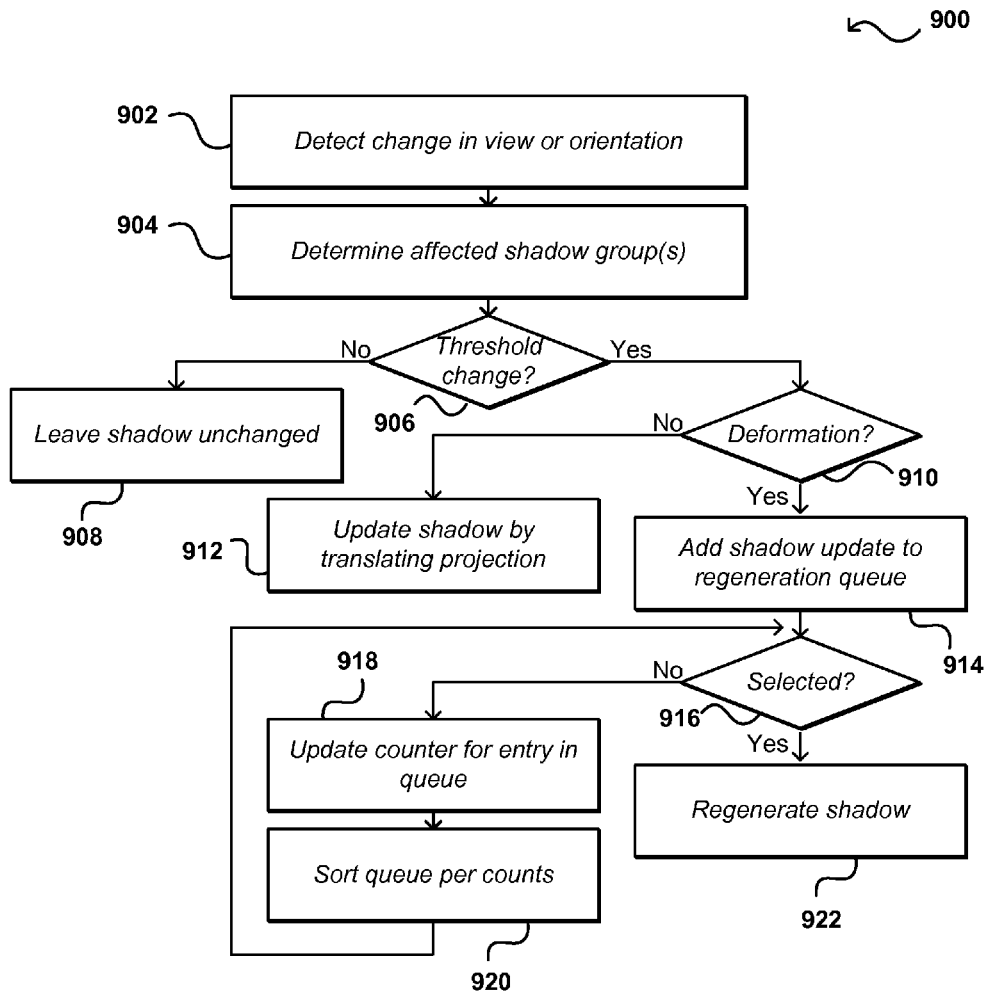
FIG. 9 illustrates an example process for updating shadows cast by elements of a user interface that can be utilized in accordance with various embodiments.

After rendering, one or more changes may occur that can cause at least some of the shadows to have to be regenerated. FIG. 9 illustrates an example process 900 for determining when to regenerate one or more shadows that can be utilized in accordance with various embodiments. In this example, a UI has been rendered and displayed on a display screen of a computing device using a process such as that described with respect to FIG. 8. As discussed, while the UI is displayed the computing device can attempt to determine motion that might affect the display of the interface, such as a change in orientation of the device or a movement of the user's head, or a combination thereof. The change in orientation of the device can be detected using one or more device sensors, such as a gyroscope, accelerometer, inertial sensor, and the like. The change in orientation and/or user head position can be determined by analyzing one or more images captured by one or more cameras of the device, among other such options. During the displaying, a change in the view and/or orientation can be detected 902 using any of these or other such approaches. Based at least in part upon the amount and direction of the change, a new viewing direction can be calculated and the shadow group(s) affected by the change determined 904. For example, a change in orientation might cause the shadows cast by one or more shadow groups to move or change shape, and the relative positions and/or shapes of the shadow groups might change as well. A determination can be made 906 as to whether any of these changes for a given shadow group meet or exceed an actionable threshold. Thresholds can be used in some embodiments to allow for slight natural movements of a user's head or hand, without interpreting those small movements as intended input. Further, continually updating for small variations can be very resource intensive, and the continual small variations can be distracting for the user and can negatively impact the overall user experience. If the changes do not meet or exceed an actionable threshold, the shadow for the given shadow group can remain unchanged 908 on the display.

If at least one change with respect to a shadow group meets or exceeds an actionable threshold, information for the shadow group can be passed to a display updating process or other such component. In at least some embodiments, a determination can be made as to whether a deformation should occur 910 as a result of the change. A deformation can be the result of a change in view (i.e., rotation), for example, that will cause one or more elements of the shadow group to be displayed with a difference in shape that exceeds a specified amount of variation. The amount that an object can vary due to a number of factors, such as size and depth in the displayed image, but should be set such that the shadow cast by that object does not appear to a user to no longer match if the shape of the shadow group changes but the shape of the shadow cast by that shadow group does not. If the shape does not change by at least this amount, but there is an actionable change of the shadow group, the shadow cast by that shadow group can be updated 912 by translating the projection of the shadow (i.e., the blurred silhouette) onto the affected receiver(s). If the amount of deformation meets or exceeds an actionable amount or threshold, information for the shadow group can be added 914 to a shadow regeneration queue. As mentioned, the regeneration queue can be used to hold pending jobs for shadows that need to be updated, but that might not be updated for the next frame to be displayed based at least in part upon a throttling parameter set for the UI. If the job is selected 916 from the queue, the shadow can be regenerated 922 using a process similar to that used to generate the shadow previously. If the group is not selected from the queue, a counter (or other mechanism) for the shadow group can be updated 918 or incremented, as a representation of the number of frames (or other time metric) that the job has been pending in the queue. In some embodiments, the queue can be sorted 920 based on the counter values such that the jobs pending in the queue the longest will be the first to be selected. As mentioned, in many cases a throttling value can be used to determine the maximum number of jobs to take from the queue for any given frame, although in some cases the number of shadows to be regenerated in a given frame might be allowed to exceed the threshold if the number of there are jobs in the queue that have been pending the maximum number of frames. Once the job is finally selected, the shadow can be regenerated as discussed.

Although discussed primarily with respect to changes in viewing angle, shadows may also need to be adjusted or regenerated based at least in part upon changes in apparent depth (i.e., z-depth) of one or more UI elements. In various embodiments, a UI framework can be enhanced to manage 3D depths of each of the UI elements of the framework via a 3D layout container or 3D depth manager. The 3D depth manager may be associated with a virtual light source having properties as discussed elsewhere herein that can be configured by a user. In at least some embodiments, the 3D depth manager can also be adapted to be associated with multiple light sources by a device or a user of the device. Further, the 3D depth manager can be responsible for managing shadows of UI elements and optimizing drawing or rendering of the shadows. In some embodiments, a shadow group element that is to cast a shadow and/or receive a shadow can enable such functionality by registering itself with the 3D depth manager. The 3D depth manager can maintain state information for each depth that includes the position and dimensions of the UI elements at the depth and shadows that may be cast at that depth. When a UI element registers with the 3D depth manager, the 3D depth of the UI element can be obtained. If the UI element's 3D depth is not associated with any existing state information, the state information can be updated with the new depth and the position and dimensions of the UI element at the new depth. In some embodiments, the position and dimensions of a UI element may be defined by a rectangular area at the depth that bounds the UI element. The 3D depth manager can determine whether any UI elements at higher depths can cast shadows at the new depth and update the state information with the new shadows for the new depth accordingly. The 3D depth manager may also remove shadow pairings that may no longer be applicable as a result of introducing the new depth. Further, the 3D depth manager may determine whether the UI element can cast shadows on any UI elements at lower depths and likewise update the state information for the lower depths. In some embodiments, the position and dimensions of a shadow can depend on the position and dimensions of a corresponding UI element (e.g., "shadow caster") and the properties of the virtual light source(s). For example, the position and dimensions of the shadow can include an x-y offset from the shadow casting UI element, a depth of the shadow-casting UI element, and the position and dimensions of other UI elements (e.g., "shadow receivers"). In one embodiment, the dimensions of the shadow (e.g., width and height) can be similar or substantially similar to the dimensions of the corresponding shadow-casting UI element. In some embodiments, the shadows may depend upon the opacity of the shadow-casting UI element. For example, a UI element may comprise text and the shadow cast by such a UI element would only include portions of the UI element that are opaque.

In various embodiments, the 3D depth manager may use one or more k-dimensional (k-d) trees, binary space partitioning (BSP) trees, quadtrees, octrees, or variations thereof for quickly determining any collisions between UI elements and shadows at each depth. That is, these various algorithms can be used to determine where a shadow intersects with a shadow group or UI element (e.g., where the shadow overlays the shadow receiving UI element). For instance, a quadtree is a data structure that can be used to represent a 2D region, such as a 2D region corresponding to a 2D display screen or other display element. The quadtree is formed by iteratively decomposing a region into four equal quadrants such that each leaf node contains data corresponding to a specific sub-region. A quadtree with a depth of n may be used to represent an image consisting of $2_n \times 2^n$ pixels. A quadtree begins with a root node that can represent the entire 2D region. As objects, such as UI elements, are added to the quadtree, a node will be split into four nodes and each object (e.g., UI element) can be inserted into one of the sub-nodes according to where it lies in 2D space. Quadtrees can be used to quickly detect collisions by determining whether a first object (e.g., UI element) intersects with another object (e.g., UI element). That is, a determination can be made whether the boundaries of the first object overlap with the boundaries of a second object. In one embodiment, a 3D depth manager can maintain a pair of quadtrees, one for UI elements and another for shadows, for each distinct depth of a user interface. If a first portion of a first UI element is covered by a second portion of a second UI element or shadow, the first portion does not need to be redrawn or rendered. Such an approach can be used to optimize rendering by reducing or minimizing overdrawing of portions of first UI elements and/or shadows that may be positioned beneath second UI elements and/or shadows at depths above the first UI elements and/or shadows.

The 3D depth manager can also manage state information when a UI element changes depth. The 3D depth manager can remove the UI element at its previous depth, update the position and dimensions of the UI element at its new depth, update or remove the shadows previously cast by the UI element, update or remove shadows previously received by the UI element, update or add shadows that are cast by the UI element at depths below the new depth, and add shadows received to the UI element at depths above the new depth. As mentioned, one or more k-d trees, BSP trees, quadtrees, octrees can be used to quickly facilitate collision detection (e.g., intersection or overlap) between UI elements and shadows at various depths.

As mentioned, in at least some embodiments the change in viewing angle or relative position can be determined by analyzing one or more images captured by a camera of the device. In some embodiments, more robust position information can be estimated by analyzing multiple images from multiple cameras captured at the same time or substantially at the same time in a process referred to as reconstruction. When there are two images or a stereo pair of images, the reconstruction process may include finding a plurality of corresponding points between two images, determining the fundamental matrix from the corresponding points, determining the camera matrices from the fundamental matrix, triangulation of the 3D points that project to the corresponding 2D points in the two images, and rectifying the projective reconstruction to metric. Variations on this approach are possible, such as where the cameras are calibrated. Approaches for camera calibration include the direct linear transformation (DLT) method, or the algorithm set forth in Tsai, Roger. "A versatile camera calibration technique for high-accuracy 3D machine vision metrology using off-the-shelf TV cameras and lenses." *Robotics and Automation, IEEE Journal of* 3, no. 4 (1987): 323-344, or the algorithm set forth in Zhang, Zhengyou. "A flexible new technique for camera calibration." *Pattern Analysis and Machine Intelligence, IEEE Transactions* on 22, no. 11 (2000): 1330-1334, each of which is incorporated herein by reference. In the case where the cameras are calibrated, the essential matrix can be computed instead of the fundamental matrix, and determining the camera matrices may be unnecessary.

Finding corresponding points between two images generally involves feature matching. The fundamental matrix is a mapping from the two-dimensional projective plane of the first image to the pencil of epipolar lines corresponding to the second image. Approaches for determining the fundamental matrix include the seven-point correspondences algorithm, the normalized eight-point algorithm, the algebraic minimization algorithm, minimization of epipolar distance, minimization of symmetric epipolar distance, the maximum likelihood (Gold Standard) method, random sample consensus (RANSAC), least median of squares, among others. In some embodiments, the essential matrix may be calculated if the camera calibration matrices are known.

Triangulation computes the 3D point that project to each point correspondence between the two images. Approaches for triangulation include linear methods, the optimal triangulation method, among others. Rectifying the projective reconstruction to metric can be implemented directly, such as by computing the homography for five or more ground control points with known Euclidean positions. Another approach for rectifying the projective reconstruction is referred to as the stratified method, which may involve an affine reconstruction and a metric reconstruction. One of ordinary skill in the art will appreciate that other embodiments may reconstruct 3D points from multiple 2D images, such as approaches based on calculating the trifocal tensor for three images or techniques based on the factorization algorithm or bundle adjustment for n images.

Alternatively, or in addition, other sensors, such as accelerometers, gyroscopes, magnetometers, or some combination thereof, can also be used to estimate the user's relative position. For example, when only motion/orientation sensors are used, it may be assumed that the absolute position of the user's head remains the same or substantially the same when the device is moved or its orientation changed. The motion and/or orientation of the device can be determined from the motion/orientation sensors, and the relative position of the user can be estimated from the data captured by the motion/orientation sensors based on the assumption that the user's absolute position remains the same. In other embodiments, image analysis techniques can be combined with approaches using motion/orientation sensors. These various approaches are discussed elsewhere herein or incorporated by reference herein.

Based on the estimated relative position of the user, the position and dimensions of UI elements and their corresponding shadows can be determined. For example, the presentation of a UI element may depend on a particular position of the user. When the user's line of sight is perpendicular or substantially perpendicular to the display screen, the UI can presented in a first manner such as at a first position and a first set of dimensions. When the user's line of sight changes according to predetermined thresholds, such as by a specified number of degrees or distance, the UI element may be rendered to correspond to the new relative position so as to provide the user the impression he is interacting with the UI element in an environment associated with 3D depth. Thus, a transformation comprising at least one of a rotation, scale, translation, or perspective projection can be applied to the UI element from the user's first relative position to the user's second relative position to simulate 3D depth.

After the positions and dimensions for the UI elements and shadows are determined, the UI elements and shadows can be displayed according to the determined positions and dimensions. As the UI framework in accordance with various embodiments simulates 3D depth, some portions of UI elements and shadows may be occluded by UI elements at higher depths. Thus, in some embodiments, a portion of a UI element may be visible when no portion of UI elements having a higher depth intersect that portion, and a portion of a shadow may be visible when the corresponding shadow-casting UI element does not intersect that portion of the shadow and no portion of UI elements having a higher depth than the shadow intersect that portion of the shadow. In some embodiments, shadows may be partially transparent such that portions of the UI element upon which the shadow casts can remain partially visible. In some embodiments, shadows may overlap and overlapping regions may appear to be less transparent or darker than portions of shadows that do not overlap with other shadows.

In certain situations, a UI element may change during the course of operating the computing device. As mentioned, a UI element can be altered by user interactions with the computing device such as touch gestures, voice commands, head gestures, hand gestures, physical button presses, among other user input modalities. This can include, for example, a depth of the UI element being changed or the appearance of the UI element being changed to correspond to a new perspective or viewing angle of the user with respect to the computing device. The UI element can also change based on receiving other types of information, such as data from a remote server or data from the device itself, such as an alarm, a notification, or other application operating on the device. When at least one UI element is altered, the positions and dimensions of other UI elements and the shadows may also be altered to reflect the modification to the altered UI element. Thus, the positions and dimensions for the UI elements and their corresponding shadows can be recalculated. In the case of the UI element whose depth has changed, this can involve removing state information for the UI element at its previous depth and inserting the state information for the UI element at its new depth, updating or removing the shadows previously cast by the UI element, updating or removing shadows previously received by the UI element, updating or adding shadows that are cast by the UI element at depths below the new depth, and adding shadows received to the UI element at depths above the new depth. In the case of other UI elements, those UI elements intersecting with the UI element whose depth has changed, at both the previous depth and the new depth, can be invalidated or marked dirty to redraw those elements. After the new positions and dimensions for the UI element and its corresponding shadow and invalidated UI elements and their corresponding shadows have been determined, the UI elements and their corresponding shadows can be displayed according to the new positions and dimensions.

Figure 10:
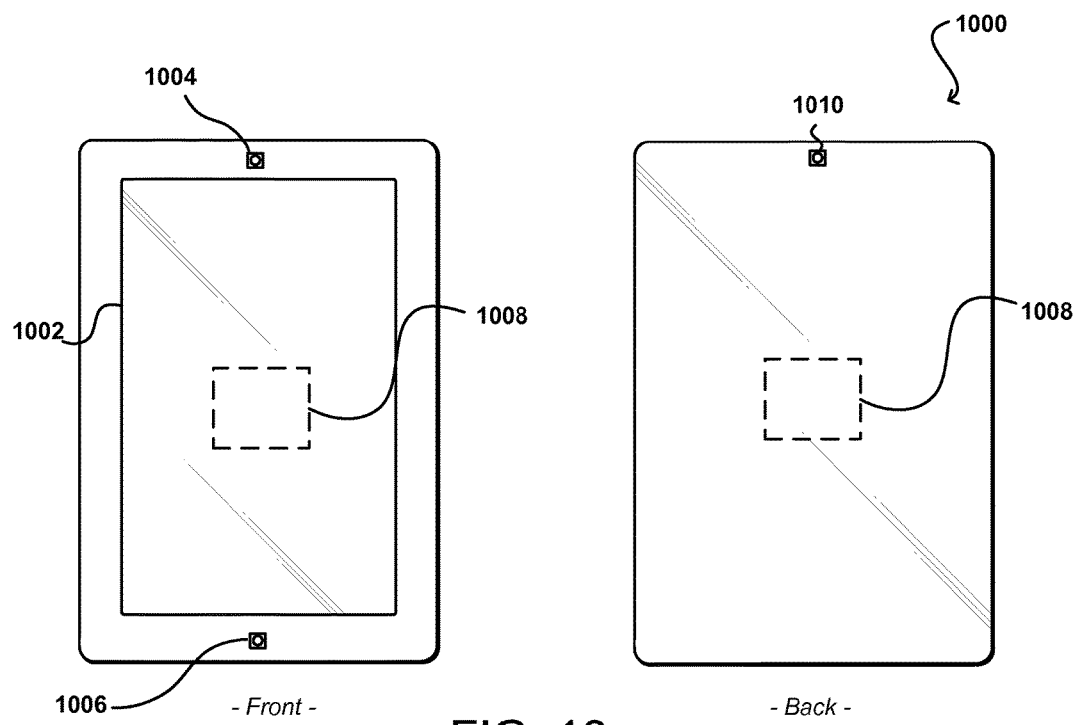
FIG. 10 illustrates an example of a computing device that can be used in accordance with various embodiments.
Figure 11:
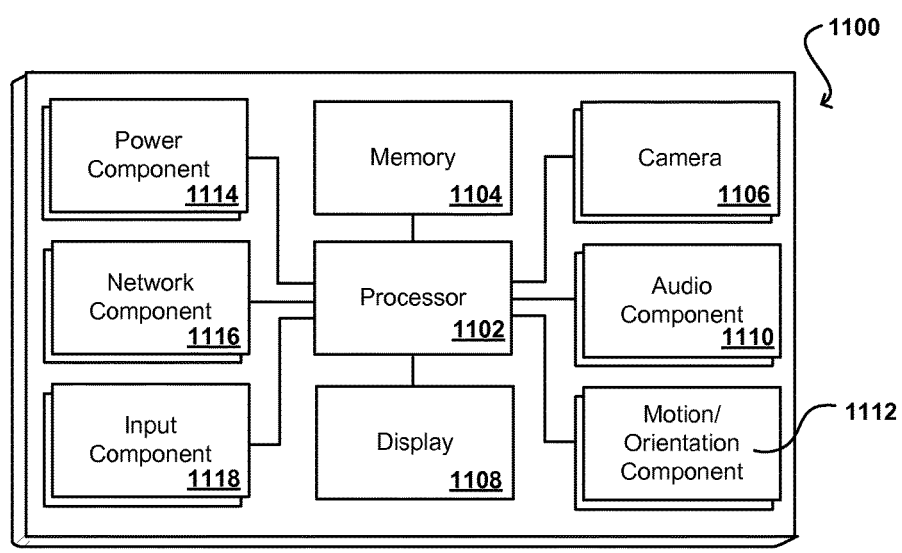
FIG. 11 illustrates an example configuration of components of a computing device such as that illustrated in FIG. 10.

FIG. 10 illustrates an example computing device 1000 that can be used to perform approaches described in accordance with various embodiments. In this example, the device includes two front-facing cameras 1004, 1006 located near the top and bottom of the device as a display element 1002, and enabling the device to capture images of a user of the device in accordance with various embodiments. The device can also include one or more cameras 1010 on a back side or in other locations as well. The computing device also includes a device sensor 1008, such as a motion or orientation sensor, operable to detect motion and/or a change in orientation of the device and provide information about the motion or change. The device sensor can include, for example, an inertial measurement unit, a three-axis gyroscope, a three-axis accelerometer, magnetometer, an electronic compass, a proximity sensor, and the like.

FIG. 1100 illustrates a logical arrangement of a set of general components of an example computing device 1100 such as the device 1000 described with respect to FIG. 10. In this example, the device includes a processor 1102 for executing instructions that can be stored in a memory component 1104. As would be apparent to one of ordinary skill in the art, the memory component can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1108, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 1006 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices. The device can also include at least one audio component 1110, such as a microphone or speaker for audio capture and/or transmission.

The computing device 1100 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 1114 known in the art for providing power to a computing device, which can include capacitive charging elements for use with a power pad or similar device. The computing device can include one or more communication elements or networking sub-systems 1116, such as a Wi-Fi, Bluetooth, RF, wired, or wireless communication system. The device in many embodiments can communicate with a network, such as the Internet, and may be able to communicate with other such devices. In some embodiments the device can include at least one additional input element 1118 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

The device 1100 also can include one or more orientation and/or motion sensors 1112. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1102, whereby the device can perform any of a number of actions described or suggested herein.

In some embodiments, the device 1100 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 1100 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 1100 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera 1106 of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output device (e.g., a display device, printer or speaker). Such a system may also include one or more storage components, such as disk drives, optical storage devices and solid-state storage systems such as random access memory (RAM) or read-only memory (ROM), as well as removable media, memory cards, flash cards, etc.

Such devices can also include a computer-readable storage media reader, a communications component (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage systems or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   a display screen; and
   memory including instructions that, when executed by the one or more processors, cause the computing device to:
   determine a plurality of graphical elements of a user interface to be displayed on the display screen, each of the graphical elements being associated with a node of a hierarchical scene graph;
   group subsets of related graphical elements into a set of shadow groups, each of the graphical elements being directly related through the hierarchical scene graph to at least one other graphical element;
   determine a first shadow group, of the set of shadow groups, that casts a shadow on a second shadow group, of the set of shadow groups, the shadow cast based on a location of a virtual light source and a spatial relation of the first shadow group to the second shadow group;
   determine a silhouette for the first shadow group to be applied as the shadow to the second shadow group, the silhouette determined at least in part by applying a blurring process to a single texture for the first shadow group;
   project at least a portion of the silhouette onto at least a portion of the second shadow group in order to generate the shadow on the second shadow group;
   determine an actionable change associated with at least one of the first shadow group or the second shadow group;
   cause identifying information for the shadow to be added to a shadow regeneration queue, the shadow regeneration queue associated with a throttle value limiting a maximum number of shadows able to be regenerated per frame for the user interface; and
   regenerate the shadow in response to the identifying information for the shadow being selected from the shadow regeneration queue, regenerating the shadow comprising at least in part determining a new texture, for the first shadow group, to be blurred and projected as a regenerated silhouette onto the second shadow group.

2. The computing device of claim 1, wherein determining the actionable change includes detecting a change associated with the user interface that satisfies a determined change criterion, the change including at least one of a change in orientation of the computing device, a change in relative orientation of a user to the computing device, or an input to the user interface.

3. The computing device of claim 1, wherein the instructions when executed further cause the computing device to:
   determine that a second shadow cast by the second shadow group onto a third shadow group is associated with an actionable change that does not require regeneration; and
   update the second shadow by translating a projection of an already-generated second silhouette for the second shadow group with respect to the third shadow group.

4. A computer-implemented method, comprising:
   grouping a first subset of user interface (UI) elements into a first shadow group and a second subset of UI elements into a second shadow group, each of the first subset of UI elements and the second subset of UI elements being associated with a node of a hierarchical scene graph, the first subset of UI elements being directly related through the hierarchical scene graph;
   determining a single texture for the first subset of UI elements;
   blurring the single texture to create a silhouette corresponding to the first subset of UI elements;
   rendering a shadow on the second subset of UI elements, a shape of the shadow being based on at least a portion of the silhouette, the shadow rendered at least in part by adjusting a pixel value of pixels of the second subset of UI elements corresponding to a location of the shadow;
   determining an actionable change associated with the shadow;
   adding identifying information for the shadow to a shadow regeneration queue, the shadow regeneration queue associated with a throttle value limiting a maximum number of shadows to be re-rendered per frame; and
   causing the shadow to be re-rendered based at least in part on the identifying information being selected from the shadow regeneration queue.

5. The computer-implemented method of claim 4, further comprising:
   analyzing an outline of shapes of the UI elements in the first shadow group to determine an overall shape of the single texture, the single texture having a solid grayscale color.

6. The computer-implemented method of claim 4, further comprising:
   determining that the first subset of UI elements is capable of casting a shadow on the second subset of UI elements using an intersection test, the intersection test based at least in part upon a relationship of the UI elements of the first shadow group to the UI elements of the second shadow group according to the hierarchical scene graph.

7. The computer-implemented method of claim 4, further comprising:
selecting a width for the blurring, the blurring performed using at least a two-pass Gaussian blur.

8. The computer-implemented method of claim 4, further comprising:
determining a location of a virtual light source, wherein rendering the shadow includes determining a frustum for the UI elements of the first subset based at least in part upon the location of the virtual light source.

9. The computer-implemented method of claim 4, further comprising:
detecting a change relating to the user interface; and
determining the change to be the actionable change when the change meets or exceeds at least one change threshold, the at least one change threshold relating to at least one of an amount of movement or an amount of change in shape of at least one of the first shadow group or the second shadow group.

10. The computer-implemented method of claim 9, further comprising:
translating the shadow across the UI elements of the second subset in response to the actionable change corresponding to the amount of movement.

11. The computer-implemented method of claim 9, further comprising:
re-rendering the shadow in response to the actionable change corresponding to the amount of change in shape.

12. The computer-implemented method of claim 11, wherein re-rendering the shadow further comprises:
determining an updated texture for the UI elements in the first subset of UI elements;
blurring the updated texture to create an updated silhouette corresponding to the UI elements in the first subset; and
rendering an updated shadow on the UI elements of the second subset, a shape of the shadow being based on at least a portion of the updated silhouette.

13. The computer-implemented method of claim 9, wherein the change is detected based at least in part upon a motion detected by at least one device sensor.

14. The computer-implemented method of claim 9, further comprising:
determining a type of the second shadow group, the type being at least one of a two-dimensional group or a three-dimensional group; and
determining a type of shadow to be rendered based at least in part upon the type of the second shadow group.

15. A computing device, comprising:
at least one processor; and
memory including instructions that, when executed by the at least one processor, cause the computing device to:
group a first subset of user interface (UI) elements into a first shadow group and a second subset of UI elements into a second shadow group, each of the UI elements in the first subset of UI elements and each of the UI elements in the second subset of UI elements being associated with a respective node of a hierarchical scene graph;
determine a single texture for the first subset of UI elements;
blur the single texture to create a silhouette corresponding to the first subset of UI elements;
render a shadow on the second subset of UI elements, a shape of the shadow being based on at least a portion of the silhouette;
determine an actionable change associated with the shadow;
add identifying information for the shadow to a shadow regeneration queue, the shadow regeneration queue associated with a throttle value limiting a maximum number of shadows to be re-rendered per frame; and
cause the shadow to be re-rendered based at least in part on the identifying information being selected from the shadow regeneration queue.

16. The computing device of claim 15, wherein the instructions when executed further cause the computing device to:
determine that the UI elements of the first subset are capable of casting a shadow on the second subset using an intersection test, the intersection test based at least in part upon a relationship of the UI elements of the first subset to the UI elements of the second subset according to the hierarchical scene graph.

17. The computing device of claim 15, wherein the instructions when executed further cause the computing device to:
detect a change relating to the user interface; and
determine the change to be the actionable change when the change satisfies at least one change criterion, the at least one change criterion relating to at least one of an amount of movement or an amount of change in shape of at least one of the first shadow group or the second shadow group.

18. The computing device of claim 17, wherein the instructions when executed further cause the computing device to:
translate the shadow in response to the actionable change corresponding to the amount of movement.

19. The computing device of claim 17, wherein the instructions when executed further cause the computing device to:
re-render the shadow in response to the actionable change corresponding to the amount of change in shape.

* * * * *